United States Patent
Grabs et al.

(10) Patent No.: US 11,626,769 B2
(45) Date of Patent: Apr. 11, 2023

(54) EXTERNAL ROTOR MOTOR WITH CAST STATOR

(71) Applicant: Lenze Drives GmbH, Extertal (DE)

(72) Inventors: Volker Grabs, Bodenwerder (DE); Matthias Thesseling, Hameln (DE); Olaf Huebner, Delligsen (DE)

(73) Assignee: Lenze Drives GmbH, Extertal (DE)

( * ) Notice: Subject to any disclaimer, the term of this patent is extended or adjusted under 35 U.S.C. 154(b) by 307 days.

(21) Appl. No.: 16/605,327

(22) PCT Filed: Apr. 18, 2018

(86) PCT No.: PCT/DE2018/100365
§ 371 (c)(1),
(2) Date: Feb. 4, 2021

(87) PCT Pub. No.: WO2018/192628
PCT Pub. Date: Oct. 25, 2018

(65) Prior Publication Data
US 2021/0152045 A1     May 20, 2021

(30) Foreign Application Priority Data

Apr. 21, 2017 (DE) .......................... 102017003865.1

(51) Int. Cl.
*H02K 5/173* (2006.01)
*H02K 7/08* (2006.01)
*H02K 21/22* (2006.01)

(52) U.S. Cl.
CPC .......... *H02K 5/1737* (2013.01); *H02K 7/088* (2013.01); *H02K 21/22* (2013.01)

(58) Field of Classification Search
CPC .......... H02K 1/187; H02K 21/22; H02K 5/08; H02K 5/15; H02K 5/1737; H02K 5/24; H02K 7/088
See application file for complete search history.

(56) References Cited

U.S. PATENT DOCUMENTS 4,048,530 A * 9/1977 Kaufman, Jr. ........... H02K 5/08
                                                     310/90
4,337,405 A * 6/1982 Hishida .................. H02K 21/22
                                                     310/90

(Continued)

FOREIGN PATENT DOCUMENTS

CN         2097470 U      2/1992
CN         1510199 A * 7/2004 ........... D06F 37/206

(Continued)

*Primary Examiner* — Naishadh N Desai
(74) *Attorney, Agent, or Firm* — Muirhead and Saturnelli, LLC

(57) ABSTRACT

An electric machine may be an external rotor motor with a stator and a rotor surrounding the stator. The rotor may be mounted on bearings so as to be rotatable around an axis of rotation relative to the stator, where the mechanical forces transmitted by the bearings of the rotor may be absorbed at least in part by the stator. The stator may have a coil winding for generating a magnetic field, the coil winding being surrounded at least partially by a casting compound. At the output, the mechanical forces of the rotor or the device transmitted by the bearings and taken up by the stator may be introduced into the stator largely via the casting compound. The casting compound thus reduces induced vibrations.

11 Claims, 1 Drawing Sheet

(56) References Cited

U.S. PATENT DOCUMENTS

| | | | |
|---|---|---|---|
| 8,022,581 B2* | 9/2011 | Stiesdal | H02K 5/08 |
| | | | 310/43 |
| 8,476,794 B2 | 7/2013 | Amutham | |
| 2001/0048254 A1* | 12/2001 | Engel | H02K 29/08 |
| | | | 310/68 B |
| 2002/0062706 A1 | 5/2002 | Baasch et al. | |
| 2004/0222712 A1* | 11/2004 | Hong | H02K 5/08 |
| | | | 310/43 |
| 2010/0019586 A1* | 1/2010 | Lu | H02K 5/08 |
| | | | 310/43 |
| 2012/0028773 A1 | 2/2012 | MacFarlane et al. | |

FOREIGN PATENT DOCUMENTS

| | | | | |
|---|---|---|---|---|
| CN | 101615817 A | 12/2009 | | |
| CN | 102820728 A | 12/2012 | | |
| CN | 203377713 U | 1/2014 | | |
| CN | 203617798 U | 5/2014 | | |
| CN | 203617866 U | 5/2014 | | |
| CN | 203962429 U | 11/2014 | | |
| CN | 204012959 U | 12/2014 | | |
| CN | 205945461 U | 2/2017 | | |
| CN | 206412914 U | 8/2017 | | |
| CN | 107819385 A | * 3/2018 | ........... | H02K 1/2753 |
| CN | 211557066 U | * 9/2020 | .............. | H02K 5/10 |
| DE | 89 07 737 U1 | 10/1989 | | |
| DE | 100 51 373 A1 | 4/2002 | | |
| DE | 100 60 940 A1 | 6/2002 | | |
| DE | 103 59 577 A1 | 6/2005 | | |
| DE | 10 2009 026 045 A1 | 2/2010 | | |
| EP | 2 532 892 A1 | 12/2012 | | |
| JP | H-06209549 A | 7/1994 | | |
| JP | WO2017141412 A1 | * 8/2017 | | |
| WO | WO 2012/013674 A1 | 2/2012 | | |
| WO | WO-2017162389 A1 | * 9/2017 | ........... | H02K 5/1735 |

* cited by examiner

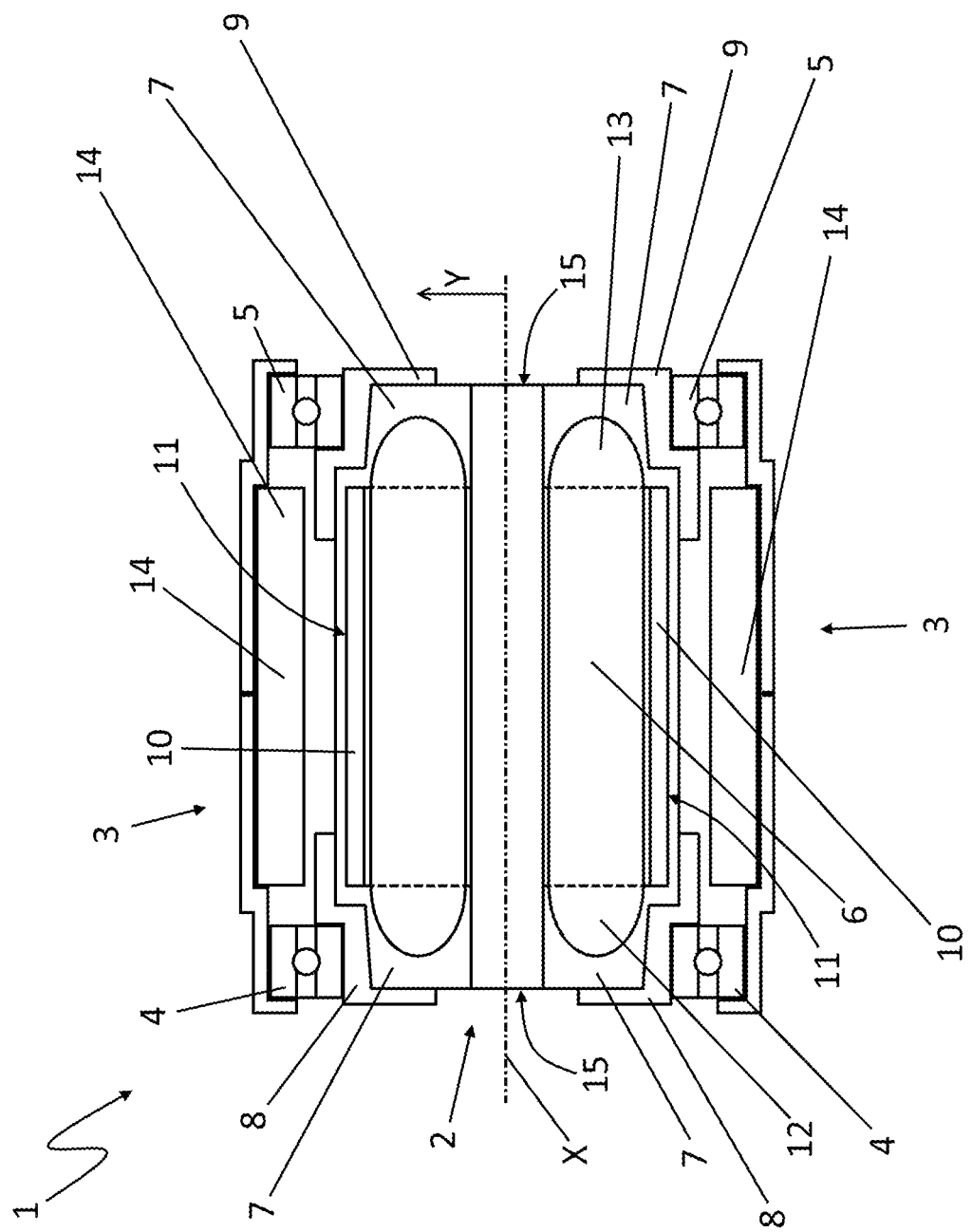

EXTERNAL ROTOR MOTOR WITH CAST STATOR

TECHNICAL FIELD

The system described herein relates to an external rotor.

BACKGROUND OF THE INVENTION

Electrical machines of the kind under discussion have a stator, that is to say a stationary element, and a rotor, that is to say an element which is mounted such that it can rotate about a rotation axis relative to the stationary element. The electrical machine serves to convert electrical energy into mechanical work. Here, magnetic fields may be generated by means of the electrical energy, which magnetic fields in turn set the rotor in rotation relative to the stator. The magnetic fields may be generated by means of a coil winding of the stator. The coil winding is generally embedded in a casting compound. Here, the casting compound can completely or partially surround the coil winding. The casting compound typically serves to protect the coil winding against, in particular, mechanical impairments. Electrical machines of this kind are also referred to as external rotor motors in particular. In external rotor motors, the rotor surrounds the stator.

Electrical machines of the kind under discussion in which the stator can absorb mechanical forces which act on the rotor are known from the prior art. Here, the mechanical forces are introduced into the stator via the rotatable mounting of the rotor. Electrical machines of this kind are generally fastened by way of the stator thereof to a stationary structure. The rotatable rotor can then transmit its rotary movement directly to a gear mechanism, for example via a tooth system. Reaction forces which can be introduced into the stator via the rotatable mounting of the rotor are produced in an application of this kind. It goes without saying that any desired other applications in which corresponding forces are introduced into the stator via the rotor are also conceivable.

Electrical machines of the kind under discussion are distinguished, in principle, in that solutions with a comparatively low installation space requirement can be realized with said electrical machines. Therefore, electrical machines of this kind are used, for example, in the model building sector.

In order to be able to introduce mechanical forces into the stator via the mounting of the rotor, the rotor is fastened on a shaft according to the prior art. This shaft is passed through the stator. The rotatable mounting of the rotor is located between the shaft and the stator. The rotor, which surrounds the stator, is typically connected to the rotation axis at one end of the electrical machine—in the axial direction with respect to the rotation axis. The other end of the electrical machine in the axial direction with respect to the rotation axis is generally available for fastening the stator to a structure which is stationary relative to the electrical machine.

However, there is a certain installation space requirement owing to the shaft of the rotor, which shaft is passed through the stator, and the associated rotatable mounting of the shaft. Thus, it may be desirable to have an external rotor which allows a more compact construction.

SUMMARY OF THE INVENTION

Described herein is a system for which forces that are transmitted via a mounting of a rotor and absorbed by a stator of an electrical machine may be at least partially introduced into a stator via a casting compound. The introduction of the mechanical forces via the casting compound may allow the mounting between the stator and the rotor to be moved to the outside. It should be appreciated that all mechanical forces which are introduced into the stator from the rotor via its mounting may be advantageously introduced into the stator via the casting compound.

It may be advantageous when an electrical machine according to an embodiment of the system described herein has a first bearing seat element, which may be arranged between the casting compound and a first bearing for rotatably mounting the rotor, for providing a bearing seat for a first bearing of the mounting of the rotor. A bearing seat element of this kind may have the advantage that it may provide a bearing seat of better quality. As an alternative, it also may be possible for the bearing seat to be formed by the casting compound itself. A bearing seat of this kind then may be produced by turning, for example after curing of the casting compound. However, the use of a bearing seat element in particular may have an advantage that the bearing seat element may be manufactured from a material which may be particularly suitable for providing a bearing seat and may be different from the casting compound. Metal materials are suitable for this purpose. It may be desirable that the bearing seat element be composed of aluminum. In addition, a bearing seat element of this kind also may have an advantageous effect on the introduction of force into the casting compound.

It may be advantageous to provide a second bearing seat element for providing a second bearing seat for a second bearing for mounting the rotor. A second bearing seat element of this kind may have, in conjunction with the second bearing, an advantage that a mechanically expedient mounting of the rotor on the stator may be achieved via two bearings. As an alternative, it also may be possible for a bearing seat element to provide a plurality of bearing seats for a plurality of bearings.

In an embodiment of the system described herein, during the manufacture of the electrical machine, in particular during the manufacture of the stator of the electrical machine, the bearing seat element may additionally advantageously serve as a lost casting mold during the introduction of the casting compound. A cast stator according to an embodiment of the system described herein having a bearing seat element may be manufactured in a particularly simple manner in this way.

The first and/or second bearing seat element may be advantageously configured in the form of a half-shell. A configuration of this kind of the bearing seat element may be advantageous in respect of compact construction of the electrical machine and expedient introduction of forces into the stator.

The electrical machine may have a stator core. A stator core may be, in particular, a body which may be formed from a large number of lamination layers and forms the core of the coil winding. The individual lamination layers may be electrically insulated from one another in order to prevent or at least to reduce the formation of eddy currents in the stator core.

The stator core may be likewise at least partially surrounded by the casting compound. It may be particularly advantageous here when those surfaces of the stator core which are outermost with respect to the rotation axis and face the rotor are surrounded by the casting compound. In this way, the casting compound firstly also may provide protection of the stator core against mechanical impairments, and secondly the introduction of the mechanical forces via the casting compound directly into the outer regions of the stator core—which may have a comparatively high mechanical load-bearing capacity—may be rendered possible in a direct manner in this way.

An electrical machine according to an embodiment of the system described herein may advantageously be developed in such a way that a first winding head may be at least partially arranged in a region around the rotation axis, which region extends away from the rotation axis in the radial direction from 0 to 40% of the distance between the rotation axis and a point of the coil winding which may be most remote from the rotation axis. An arrangement of this kind of the winding head of the coil winding renders possible a particularly compact configuration thereof.

In this context, a winding head is to be understood to mean, in particular, that section of a coil winding which protrudes from the stator core in the axial direction. Here, the coil winding may have a first winding head and/or a second winding head which may be arranged at an end of the stator core which may be situated opposite the first winding head in the axial direction. The second winding head advantageously also may be at least partially arranged in a region around the rotation axis which extends away from the rotation axis from 0 to 40% of the distance between that point of the coil winding which may be most remote from the rotation axis and the rotation axis.

It may be particularly advantageous when the first winding head and/or the second winding head of the coil winding are/is at least partially arranged in a region around the rotation axis which extends away from the rotation axis in the radial direction by from 0 to 20% of the distance between the rotation axis and that point of the coil winding which may be most remote from the rotation axis. The winding head may be configured in a particularly compact manner in this way.

In connection with an embodiment of the system described herein, it may be further advantageous when the first winding head is arranged at least partially in the region of the first bearing seat in an axial direction with respect to the rotation axis. In other words, this means that an overlapping of the first bearing seat and the coil winding may be produced in the axial direction. This advantageously may allow a reduction in the installation space requirement of the electrical machine in the axial direction according to an embodiment of the system described herein. The same applies to the second winding head which may likewise be at least partially arranged in the region of the second bearing seat in an axial direction with respect to the rotation axis.

It may be further advantageous when the first bearing is at least partially arranged at a greater distance from the rotation axis than the first winding head. In particular, this allows the machine to be configured in an advantageous manner such that the first bearing may surround the first winding head according to an embodiment of the system described herein. This measure also leads to a particularly compact construction. Furthermore, it should be appreciated that the second bearing accordingly may be at least partially arranged at a greater distance from the rotation axis than the second winding head.

BRIEF DESCRIPTION OF THE DRAWINGS

An embodiment of the system described herein will be schematically explained in more detail below with reference to FIG. 1, which shows a schematic illustration of an illustrative electrical machine according to an embodiment of the system described herein.

DESCRIPTION OF VARIOUS EMBODIMENTS

The illustrative electrical machine 1 depicted in FIG. 1 is an external rotor motor. The external rotor motor may have a stator 2, and a rotor 3 that surrounds the stator 2. The rotor 3 may be mounted such that it may rotate relative to the stator 2 about the rotation axis X. In the example shown, a first bearing 4 and second bearing 5 serve for rotatable mounting. The bearings 4 and 5 may be embodied as ball bearings for example.

The electrical machine 1 may be designed in such a way that mechanical forces may be transmitted from the rotor 3 to the stator 2 via the mounting of the rotor 3 by means of the first bearing 4 and the second bearing 5.

The illustrative electrical machine 1 further may have a coil winding 6. The coil winding 6 may serve to generate a magnetic field. The coil winding 6 may be surrounded by a casting compound 7.

According to an embodiment of the system described herein, the mechanical forces which are transmitted by the mounting of the rotor 3 and absorbed by the stator 2 are at least partially introduced into the stator 2 via the casting compound 7 in the case of the illustrative electrical machine 1. In the example shown, all forces transmitted by the mounting of the rotor 3, that is to say by the first bearing 4 and the second bearing 5 in the example shown, may be advantageously introduced into the stator 2 via the casting compound 7.

The forces may be advantageously introduced via a first bearing seat element 8, which provides a bearing seat for the first bearing 4, and a second bearing seat element 9 which provides a bearing seat for the second bearing 5. In the example shown, the bearing seat elements 8, 9 may be advantageously configured substantially in the form of a half-shell. In the case of the illustrative electrical machine 1, the bearing seat elements 8, 9 may be manufactured from a metal, for example, from aluminum.

The illustrative electrical machine 1 additionally may have a stator core 10. The stator core 10 likewise may be at least partially surrounded by the casting compound 7. In the case of the illustrative electrical machine 1, it may be particularly advantageous for surfaces 11 of the stator core 10 which face the rotor 3 to also be surrounded by the casting compound 7. The surfaces 11 may be surfaces of the stator core 10 which are outermost with respect to rotation of the axis X.

The coil winding 6 of the illustrative electrical machine 1 may have a first winding head 12 and a second winding head 13. The first winding head 12 and the second winding head 13 may be surrounded by the casting compound 7. The first winding head 12 and the second winding head 13 may be advantageously partially arranged in a region around the rotation axis X which extends away from the rotation axis X in the radial direction Y by from 0 to 40% of the distance between the rotation axis and that point of the coil winding 6 which may be most remote from the rotation axis X. In the case of the illustrative electrical machine 1, a spatial region close to the rotation axis X may be used for accommodating the winding heads 12, 13 in this case, this contributing to the particularly compact construction of the illustrative electrical machine 1.

The first winding head 12 may be advantageously partially arranged in the region of the bearing seat of the first bearing 4 in an axial direction with respect to the rotation axis X. In a likewise advantageous manner, the second winding head 13 may be partially arranged in the region of the bearing seat of the second bearing 5 in an axial direction with respect to the rotation axis X. In the case of the illustrative electrical machine 1, this may be accompanied by the advantage of a comparatively short length of the electrical machine 1 in the direction of the rotation axis X. In this context, the fact that the first bearing 4 is arranged at a greater distance from the rotation axis X than the first winding head 12 in the case of the illustrative electrical machine 1 may be advantageous. In a likewise advantageous manner, the second bearing 5 may be likewise arranged at a greater distance from the rotation axis X than the second winding head 13.

The rotor 3 of the illustrative electrical machine 1 advantageously may have a plurality of permanent magnets 14. The permanent magnets 14 may interact with the magnetic field which may be generated by the coil winding 6 and in this way generate the rotational movement of the rotor 3 relative to the stator 2. The end faces 15 of the stator 2 advantageously may provide, in an axial direction with respect to the rotation axis X, a fastening of the electrical machine 1 to a structure which receives the electrical machine 1. In other words, the stator 2 of the illustrative electrical machine 1 may virtually take over the function of the axis of a conventional electrical machine itself, so that the desired compact construction may be produced overall.

The invention claimed is:

1. An external rotor motor, comprising:
a stator; and
a rotor which surrounds the stator, wherein the rotor is mounted such that the rotor can rotate about a rotation axis relative to the stator, wherein the mechanical forces which are transmitted by the rotatable mounting of the rotor are at least partially absorbed by the stator, wherein the stator has a coil winding for generating a magnetic field, wherein the coil winding is at least partially surrounded by a casting compound, the mechanical forces which are transmitted by the mounting of the rotor and absorbed by the stator are at least partially introduced into the stator via the casting compound, and wherein a first bearing and/or a second bearing are/is at least partially arranged at a greater distance measured in a radial direction perpendicular from the rotation axis than a distance from a first winding head and/or a second winding head to the rotation axis measured in a radial direction perpendicular from the rotation axis and wherein the winding heads are part of the coil winding.

2. The external rotor motor as claimed in claim 1, wherein the mechanical forces which are transmitted by the mounting of the rotor and absorbed by the stator are fully introduced into the stator via the casting compound.

3. The external rotor motor as claimed in claim 1, wherein the electrical machine has a first bearing seat element, which is arranged between the casting compound and the first bearing for rotatably mounting the rotor, for providing a first bearing seat for the first bearing.

4. The external rotor motor as claimed in claim 3, wherein the electrical machine has a second bearing seat element, which is arranged between the casting compound and the second bearing for rotatably mounting the rotor, for providing a second bearing seat for the second bearing.

5. The external rotor motor as claimed in claim 4, wherein the first bearing seat element and/or the second bearing seat element are/is configured at least substantially in the form of a half-shell.

6. The external rotor motor as claimed in claim 4, wherein the first bearing seat element and/or the second bearing seat element are made of a metal.

7. The external rotor motor as claimed in claim 1, wherein the electrical machine has a stator core which is at least partially surrounded by the casting compound, wherein surfaces of the stator core which are outermost with respect to the rotation axis and face the rotor are surrounded by the casting compound.

8. The external rotor motor as claimed in claim 1, wherein the first winding head and/or the second winding head are at least partially arranged in a region around a rotation axis, which region extends away from the rotation axis in the radial direction by over 40% of a distance between the rotation axis and that point of the coil winding which is most remote from the rotation axis.

9. The external rotor motor as claimed in claim 4, wherein the first winding head and/or the second winding head are/is arranged at least partially in the region of the first and/or second bearing seat in an axial direction with respect to the rotation axis.

10. The external rotor motor as claimed in claim 6, wherein the metal is an aluminum alloy.

11. The external rotor motor as claimed in claim 8, wherein the region extends away from the rotation axis in the radial direction by over 20% of the distance between the rotation axis and that point of the coil winding which is most remote from the rotation axis.

* * * * *